United States Patent Office 3,027,632
Patented Apr. 3, 1962

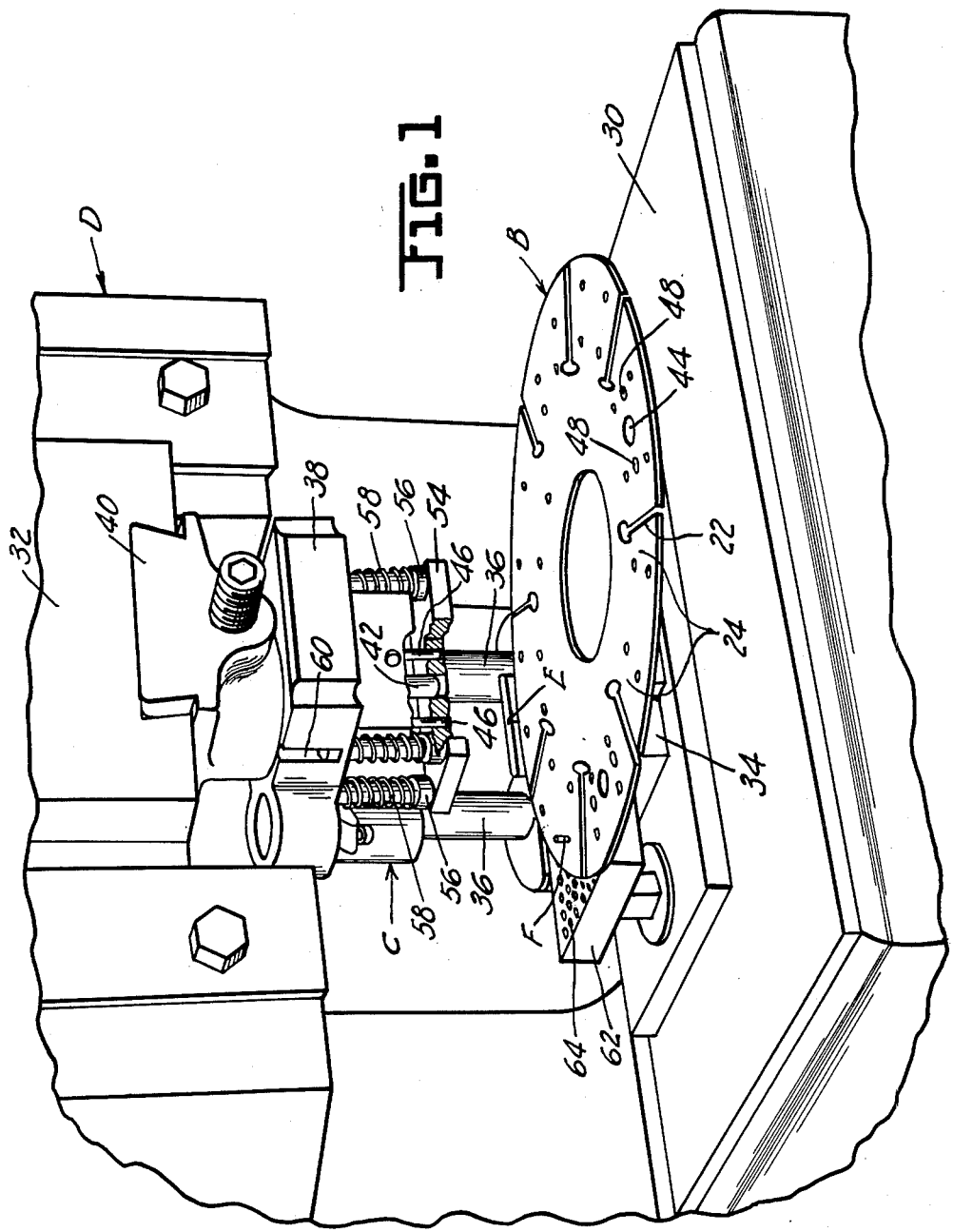

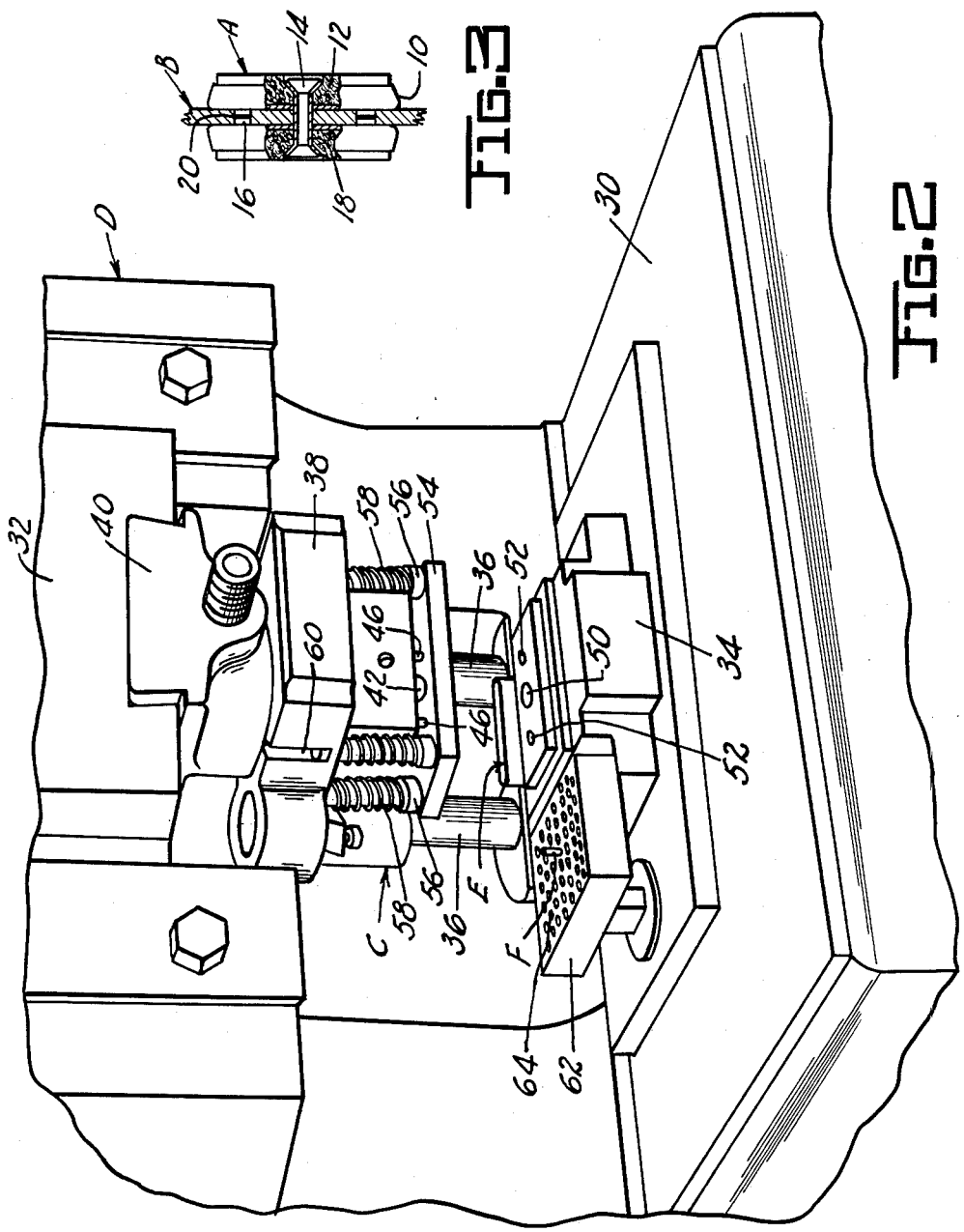

3,027,632
SIMPLIFIED METHOD AND/OR TOOL FOR REFINISHING CLUTCH PLATES
Gene P. Baynes and Albert I. Jacobsen, Troy, N.Y., assignors to The Bendix Corporation, a corporation of Delaware
Filed Nov. 27, 1959, Ser. No. 855,693
7 Claims. (Cl. 29—407)

The present invention relates to a new and improved method for simply and quickly attaching a plurality of articles to a plate in such a manner that the composite structure is statically and dynamically balanced; and more particularly, to a tool adapted for performing a symmetrical machining operation in the above process.

Unlike electrical motors, internal combustion engines are generally required to be started under no load, and accordingly a clutch is usually provided between the output of the engine and the driven structure. Internal combustion engines are generally provided with a flywheel in their output shaft; and the type of clutch structure most generally used comprises a pressure plate spaced from the end surface of the flywheel and an annular clutch plate which is positioned between the flywheel and the pressure plate. The clutch plate is suitably attached to the driven structure; and during driving engagement of the clutch, the clutch plate is tightly sandwiched between the flywheel and pressure plate by means of spring pressure. When it is desired to disengage the driven structure from the engine, external means forces the pressure plate away from the surface of the flywheel so that the clutch plate may rotate freely. In order that the clutch structure will operate smoothly during engagement and disengagement, suitable friction materials are attached to the opposite side faces of the clutch plate; and the material which is most generally used is composed principally of asbestos held by a phenolformaldehyde binder. These materials are known as organic linings and are usually affixed to the clutch plates by means of a plurality of rivets which are grouped in symmetrical arrangements spaced about the clutch plates.

The assignee of the present invention has for some time made an inorganic type of friction material which has a service life of from three to four times that of the organic linings; and while there has been a demand for converting existing clutch structure over to its use, there has been no simple and inexpensive means for attaching the inorganic linings to the clutch plates in a manner which will not throw the clutch plate out of static and dynamic balance. In order for an attachment process of the inorganic material to existing clutch plates to be commercially feasible, the attachment method must be capable of being performed simply and quickly by generally untrained personnel without the danger of producing a composite structure which is out of static and dynamic balance.

The principal object of the present invention is the provision of a new and improved method and/or tool for attaching the inorganic lining to existing clutch plates in a manner which will produce static and dynamically balanced composite structures.

A further object of the invention is the provision of a new and improved method and/or structure for symmetrically forming a plurality of holes in a plate having existing hole groupings which are generally symmetrically spaced about the plate.

It is realized that the present invention may have use in machining operations other than hole forming operations; and accordingly it is a still further object of the invention to provide a new and improved means for symmetrically machining a plate in a plurality of locations that are symmetrically spaced above the plate.

Further objects and advantages of the invention will become apparent to those skilled in the art to which it relates from the following description of a preferred method and structure for performing the same described with reference to the accompanying drawings forming a part of this specification, and in which:

FIGURE 1 is a fragmentary perspective view of a clutch plate accurately located in a tool which embodies principles of the present invention and which is installed in a conventional press;

FIGURE 2 is a fragmentary perspective view identical with that of FIGURE 1 excepting that the clutch plate is removed; and FIGURE 3 is a fragmentary cross sectional view of a clutch plate showing a pair of inorganic linings riveted thereto.

Although the invention may be otherwise used and embodied, it is herein shown and described as being used to attach a plurality of inorganic friction linings to a clutch plate which had previously had organic linings attached thereto.

The inorganic linings A which are intended to be attached to the clutch plate B are generally annular cup shaped structures 10 which have the inorganic lining material 12 contained therein. A pair of the annular cup shaped structures 10 are intended to be positioned on opposite sides of the clutch plate B and fixed thereto by means of a common rivet 14 which extends through the cups 10 and plate B. In order to prevent rotation of the cups 10 when they are riveted to the clutch plate, the bottom surface of each cup is provided with two raised portions or dimples 16 that are positioned on opposite sides of the center rivet opening 18 and which are intended to extend into corresponding openings 20 in the clutch plate B.

The clutch plates B on which the cup shaped structures 10 are intended to be attached, are generally ring shaped plates, the opposite side faces of which each have previously had an annular ring of organic friction material attached thereto. The rings are usually attached to the plate by a plurality of rivets which are identically grouped and symmetrically spaced around the clutch plates. In order to minimize thermal distortion of the plate, the plate B is slotted as at 22 between each of the symmetrical groupings of rivet holes 24.

The tool shown in the drawing for forming attachment holes for the inorganic linings, and which is used in performing the method of the present invention, includes a die set C which is positioned between the bed 30 and ram 32 of a punch press D. As best seen in FIGURE 2, the die set C comprises a lower die portion 34 which rests upon the bed 30 of the press D and which supports two guide posts 36, the upper end of which are slidably received in the upper die portion 38 to locate and guide the upper guide portion 38 during its travel towards the lower die portions 34. The upper die portion 38 has an upwardly extending boss which is clamped to the ram structure 32 by means of a suitable clamp 40; and the lower surface of the upper die portion 38 is provided with three punches which extend generally parallel to the guide posts 36. The center punch 42 is used to form the rivet hole 44 for the attachment of the inorganic linings 10; and the punches 46 which are positioned on either side of the punch 42 are identical and are used to form the antirotational holes 48 for the inorganic linings 10. The punches 42 and 46 are adapted to be received in the die openings 50 and 52 respectively in the lower die portion 34; and there is also provided a stripper plate 54 which is normally positioned around the lower ends of the punches 42 and 46 by means of four guide posts 56 and biasing springs 58. The lower end of the guide posts 56 are fixed to the stripper plate 54, and the upper end of the guide posts 56 are headed and are received in counterbores in the upper die portion 38. The headed portion of the guide posts are held in engagement with the shoulders of the counterbore 60 by the biasing spring 58 and when the ram of the press brings the stripper plate 54 down into engagement with the clutch plate B, the springs 58 yield to permit the heads of the posts 56 to move upwardly in the large diameter section of the counterbore 60. During the yielding movement of the springs 58, the punches 42 and 46 move outwardly of their receiving openings in the stripper plate 54 to engage the clutch plate B.

The punch presses which are most generally used, are driven by eccentrics; and in order that the shearing load will be distributed over a greater arc of the eccentric and thereby decrease the maximum force which the press must exert, the punches 46 are made slightly longer than the punch 42—so that the punches 46 will substantially complete their shearing operation before the center punch 42 begins its shearing operation. Downward movement of the ram 32 of course forces the punches 42 and 46 through the clutch plate B and down into the lower die openings 50 and 52 respectively, after the time that the stripper plate 54 has been pushed into engagement with the top surface of the plate B. The slugs which are pushed out of the plate B remain in the openings 50 and 52 until the next stroke of the punches; and during the upward movement of the ram, the biasing springs 58 and stripper plate 54 pull the punches 42 and 46 out of the clutch plate B.

According to principles of the present invention, the cup structures 10 are simply and quickly fastened to the clutch plate B in a manner which produces a composite structure which is statically and dynamically balanced. The cup structures are attached through holes accurately made by a tool that positions the plate B by means of an abutment stop and locating pin that passes through a predetermined hole of a hole grouping 24 while the plate is in abutment with the locating stop. Thereafter the plate is relocated so that a corresponding hole of another grouping 24 receives the locating pin and the process is repeated until a symmetrical arrangement of holes 44 and 48 is punched in the plate.

According to further principles of the present invention, it is desired to support the pin F in a manner which permits its position to be changed rapidly so that clutch plates of various diameters can be processed one after the other without appreciable time delay. As best seen in FIGURE 2, the means used to locate the pin F comprises a locating table 62 having a grid work of holes 64 therein each of which is sized to receive the pin F. The locating table 62 is positioned to one side of the holes 50 and 52 in the bottom portion 34 of the die. The pin F is located by placing a clutch plate B on top of the lower die portion 34 with one side edge in engagement with the abutment stop E and with a section of the plate which generally falls between a pair of slots 22 generally centered with respect to the punch 44. When so positioned, the hole grouping 24 of the immediate left hand pie shaped section formed by the slots 22 is positioned over the table 62. Inasmuch as there are a multiplicity of holes 64 in the locating table 62, one of the holes 64 on the locating table 62 will approximately line up with one of the holes 24 in the pie shaped plate section overlying the table. It has been found that even though one of the holes 24 in the clutch plate B does not line up exactly with a hole in the locating table 62, the clutch plate B can be moved or rotated enough so that one of its holes 24 does line up with a hole 64 in the locating table 62 without producing a composite structure which is statically and dynamically out of balance. After the punch is operated and the new holes are formed in one of the pie shaped sections of the plate, the clutch plate is rotated so that a corresponding hole in another rivet hole grouping 24 receives the locating pin F while the clutch plate is held in engagement with the stop E; and the punch is again operated to produce another set of holes 44 and 48 in a second pie shaped section of the plate B. The process is repeated as necessary to produce a desired symmetrical arrangement of new holes after which the cup shaped structures 10 are riveted in place in the new holes, as above described.

It will be seen that a method and/or tool has been provided that can be used to symmetrically machine and/or locate holes in various diameter plates. The tool shown in the drawing has been used for attaching 4 friction articles A to 11 inch diameter clutch plates B, 6 friction articles to 12, 13 and 14 inch diameter clutch plates, 8 articles to 15 inch diameter plates, and 12 buttons to 17 inch diameter plates.

Although the tool shown has been described as being a die set for punching the desired holes in the clutch plate B, it will be apparent that other types of hole making equipment as for example drilling equipment can be used in place of the punches. It will further be apparent that the invention so far described will have other uses wherein it is desired to perform a plurality of machined operations symmetrically with respect to a plate having existing groupings of holes therein which are arranged uniformly about the plate.

While the invention has been described in considerable detail, I do not wish to be limited to the particular constructions shown and described; and it is my intention to cover hereby all novel adaptations, modifications and arrangements thereof which come within the practice of those skilled in the art to which the invention relates.

We claim:

1. A method of machining clutch plates and the like having a periphery that is concentric about an axis of rotation and having a plurality of holes that are uniformly spaced around said axis and relative to said periphery, said method comprising: providing and fixing a movable material removing tool so that the line of motion of the tool is fixed; providing a work supporting surface for said plates so that plates thereon will be contacted by said tool; providing and fixing a stop for engagement by the periphery of said plate when a portion thereof to be machined is contacted by said tool; positioning said plate until a desired area to be machined is intersected by said line of motion and the periphery of said plate engages said stop; placing a pin through one of said openings in said plate and fixing said pin in position relative to said work supporting surface; moving said tool to form an opening in said plate; removing said plate from said fixed pin to bring another of said plate openings into position around said fixed pin; rotating said plate about said pin and into engagement with said stop; moving said tool to form another opening in said plate; and repeating said last three steps until a new set of machined surfaces are uniformly about said plate.

2. A method of symmetrically locating holes in a plate having a plurality of substantially identical groupings of holes therein comprising: providing and fixing hole making equipment so that the line of travel of its hole making tool through a work piece is fixed; providing and fixing a locating stop for said plate on one side of the line of travel of said hole making tool; providing and fixing a locating table having a plurality of holes therein relative to said line of travel and said stop, so that when a desired section of said plate is in the line of travel of said tool and said plate engages said stop, the holes in said table underlie a hole grouping in said plate; shifting said plate slightly until one of the holes of a hole grouping exactly aligns with a hole in said locating table and thereafter placing a pin through said aligned holes; moving said hole making tool through the plate when said plate is located by said pin and stop; moving said plate until said pin passes through a corresponding hole of another grouping in said plate; and moving said hole making tool through said plate when again located by said pin and stop to thereby accurately locate a series of holes in said plate.

3. A method of attaching a plurality of substantially identical articles to circular clutch plates and the like having a plurality of substantially identical groupings of holes therein that are uniformly spaced about the central axis of rotation of the plate to produce statically and dynamically balanced composite structures and comprising: providing and fixing hole making equipment so that the line of travel of its hole making tool through a work piece is fixed; providing and fixing a locating stop for the side edge of said plate on one side of the line of travel of said hole making tool; providing and fixing a pin generally parallel to said line of travel and spaced apart from said tool and stop to receive a predetermined hole in a hole grouping of said plate when said plate engages said stop and a desired area of said plate is in the line of travel of said tool; placing said plate over said pin so that the pin passes through said predetermined hole of a hole grouping in said plate with said plate in engagement with said stop; moving said hole making tool through said plate; moving said plate until said pin passes through a corresponding hole of another grouping in said plate; moving said hole making tool through said plate and repeating said last two steps as necessary for the forming of a uniformly spaced arrangement of new holes; and attaching one of said articles through said newly formed holes in said plate.

4. A method of attaching a plurality of substantially identical articles to symmetrical clutch plates and the like having a plurality of substantially identical groupings of holes therein that are uniformly spaced about the plate's axis of rotation to produce statically and dynamically balanced composite structures and comprising: providing and fixing hole making equipment so that the line of travel of its hole making tool through a work piece is fixed; providing and fixing a locating stop for said plate on one side of the line of travel of said hole making tool; providing and fixing a locating table having a plurality of holes therein relative to said line of travel and said stop, so that when a desired section of said plate is in the line of travel of said tool and an edge of said plate engages said stop, the holes in said table underlie a hole grouping in said plate; shifting said plate slightly until one of the holes of a hole grouping exactly aligns with a hole in said locating table and thereafter placing a pin through said aligned holes; moving said hole making tool through the plate when said plate is located by said pin and stop; moving said plate until said pin passes through a corresponding hole of another grouping in said plate; moving said hole making tool through said plate and repeating said last two steps as necessary for the forming of a symmetrical arrangement of new holes; and attaching one of said articles through each of said symmetrically arranged newly formed holes in said plate.

5. A method of attaching a plurality of substantially identical articles to substantially identical circular plates having a plurality of uniformly spaced groupings of holes therein to produce statically and dynamically balanced composite structures and comprising: providing and fixing a set of punch dies whose punch is moved in a first direction in a press; providing and fixing an abutment locating stop for the edge of said plate on one side of the line of travel of said punch; providing and fixing a locating table having a plurality of holes therein which extend generally in said first direction spaced apart from said punch and locating stop; placing a pin through one of the holes in a hole grouping of said plate and fixing the pin in a hole of said locating table; rotating said plate about said pin into abutment with said stop, punching said plate; moving said plate to bring a corresponding hole of another grouping in said plate over said pin; punching said plate, repeating said last two steps as necessary for the punching of a symmetrical arrangement of new holes; and attaching one of said articles through each of said symmetrically arranged new punched holes in said plate.

6. A tool for symmetrically machining plates having a plurality of substantially identical and symmetrically arranged groupings of holes therein and comprising: a surface for supporting one side of a plate, means for guiding a work forming tool along a predetermined path intersecting a plate on said surface, a locating stop for said plate, a table having a plurality of holes therein spaced apart from said path and locating stop, and a pin positioned in a hole of said table for receiving a predetermined hole of one of said groupings in said plate.

7. A tool for symmetrically locating holes in plates having a plurality of substantially identical and symmetrically arranged groupings of holes therein and comprising: a die set having upper and lower die portions, a pair of guide posts supported by one of said portions and slidably received in openings in the other of said portions, a punch extending parallel to said guide posts and carried by one of said portions and the other of said portions having a punch receiving hole therein, a locating abutment for one side edge of said plate, a table having a plurality of holes therein and spaced apart from said punch and locating stop, and a pin positioned in a hole of said table for receiving a predetermined one of the holes in a grouping of said plate when said plate engages said abutment and a desired portion of said plate is in line with said punch.

References Cited in the file of this patent

UNITED STATES PATENTS

| | | |
|---|---|---|
| 304,352 | Norton | Sept. 2, 1884 |
| 2,072,070 | Fisher | Feb. 23, 1937 |
| 2,199,620 | Davis | May 7, 1940 |
| 2,265,726 | Greenberg | Dec. 9, 1941 |

UNITED STATES PATENT OFFICE
CERTIFICATE OF CORRECTION

Patent No. 3,027,632 April 3, 1962

Gene P. Baynes et al.

It is hereby certified that error appears in the above numbered patent requiring correction and that the said Letters Patent should read as corrected below.

Column 4, line 54, after "uniformly" insert -- positioned --.

Signed and sealed this 7th day of August 1962.

(SEAL)
Attest:

ERNEST W. SWIDER
Attesting Officer

DAVID L. LADD
Commissioner of Patents